United States Patent
Foster

(10) Patent No.: US 7,565,988 B2
(45) Date of Patent: Jul. 28, 2009

(54) REFILLABLE/REUSABLE MIXER BOTTLE

(76) Inventor: Jason E Foster, 10077 Westwanda Dr., Beverly Hills, CA (US) 90210

( * ) Notice: Subject to any disclaimer, the term of this patent is extended or adjusted under 35 U.S.C. 154(b) by 554 days.

(21) Appl. No.: 11/463,549

(22) Filed: Aug. 9, 2006

(65) Prior Publication Data

US 2008/0035671 A1    Feb. 14, 2008

(51) Int. Cl.
*B67D 5/56* (2006.01)
(52) U.S. Cl. .................. 222/129; 222/158
(58) Field of Classification Search ............ 222/129, 222/133, 134, 129.3, 129.4, 157, 158, 145.5, 222/168.5, 416
See application file for complete search history.

(56) References Cited

U.S. PATENT DOCUMENTS

| | | | | |
|---|---|---|---|---|
| 4,355,739 A * | 10/1982 | Vierkotter | .................. | 222/134 |
| 5,054,656 A * | 10/1991 | Lasner | ........................ | 222/158 |
| 5,325,996 A * | 7/1994 | Bannigan | ..................... | 222/133 |
| 5,454,487 A * | 10/1995 | Vassiliou | ................... | 222/83.5 |
| 5,819,987 A * | 10/1998 | Miller | ........................ | 222/135 |
| 5,964,377 A * | 10/1999 | Demarest et al. | ............ | 222/136 |
| 6,739,480 B1 * | 5/2004 | Albrecht et al. | ............. | 222/137 |
| 7,118,012 B2 * | 10/2006 | Butler | ........................ | 222/129 |
| 7,467,735 B2 * | 12/2008 | Rau | ........................ | 222/464.1 |
| 7,481,335 B2 * | 1/2009 | Owens | ..................... | 222/144.5 |
| 2008/0073375 A1 * | 3/2008 | Nelson et al. | ................ | 222/129 |

* cited by examiner

*Primary Examiner*—Lien T Ngo
(74) *Attorney, Agent, or Firm*—Kleinberg & Lerner, LLP; Marvin H. Kleinberg

(57) ABSTRACT

The present invention consists of a self contained mixing and dispensing container having at least two chambers, a mechanism by which fluid may be transferred from one chamber to another, a mechanism by which to dispense the mixture, and openings in each of the chambers for refilling the chambers with the appropriate fluid.

10 Claims, 4 Drawing Sheets

REFILLABLE/REUSABLE MIXER BOTTLE

BACKGROUND OF THE INVENTION

1. Field of the Invention

The present invention relates to a container for storing, mixing, and dispensing measured volumes of liquid.

2. Description of the Related Art

The present state of the art involves the use of "pump sprayers" attached to a container to apply liquids of varying functions to the desired area to be treated with the liquid. The varying liquids may be used for cleaning, as pesticides, fertilizers, and for various other functions. Upon using the contents of the container, the present state of the art teaches to either: dispose of the container and purchase a new one, or to refill the container using a mixture of concentrate and water or a similarly pre-mixed solution.

The problems with the prior art are the two fold. By disposing of the containers, an increased amount of waste is produced, adding to the global problem of waste management. By refilling the container with a concentrate, the end user is forced into contact with a potentially hazardous material in its concentrated form. The storage of the concentrate is also an issue as concentrate liquids have a shorter shelf life and are often hazardous and poisonous. This problem is further complicated by forcing the end user to measure the ideal ratio of concentrate to dilutant to reproduce the desired effective mixture.

A number of containers have been developed which separately store two substances, and allow the two substances to be introduced to one another prior to being dispensed. U.S. Pat. Nos. 6,305,576, 6,152,296 and 6,073,803 all utilize the use of a puncturing or breaking device to allow the contents in the two containers to be mixed with one another. However, the use of the puncturing device renders the containers non-reusable.

U.S. Pat. No. 6,851,580 teaches a reusable container containing a small bottle positioned within a larger bottle, whereas the small bottle empties its contents into the large bottle using a release mechanism. The present invention utilizes a pump mechanism to introduce the concentrate to the dilutant and contains a means by which the concentrate may be measured, ensuring an accurate mixture ratio.

U.S. Pat. Nos. 4,646,948, 6,290,102 and 4,893,732 disclose containers having at least two chambers or compartments. One chamber acts as a reservoir for storing a liquid and the other chamber is a measuring and dispensing chamber arranged to receive a predetermined volume of liquid from the reservoir chamber and then to dispense the measured volume. All three prior patents disclose the transfer of liquid from the reservoir chamber to the measuring chamber by tilting the container or by squeezing the reservoir chamber to force the liquid into the measuring chamber. However, none of the prior patents disclose the mixing of liquids in the second chamber to form a third liquid.

SUMMARY OF THE INVENTION

It is an object of the invention to provide a self-contained mixing and dispensing container having a mechanism with which to measure and introduce the liquids to one another. It is another object of this invention to provide a mixing and dispensing container which is easy to manufacture and use. It is further an object of this invention to produce a mixing and dispensing container capable of having all chambers refillable, thus rendering the container reusable.

The present invention consists of a self contained mixing and dispensing container having at least two chambers, a mechanism by which fluid may be transferred from one chamber to another, a mechanism by which to dispense the mixture, and openings on each of the chambers for refilling the chambers with the appropriate fluid.

The first chamber contains a concentration of the active solution and the inlet connected to a mechanism by which the concentrate is introduced to the second chamber. The mechanism may be a pump, siphon, or any other instrument capable of displacing the concentrate. The mechanism is designed to transfer a finite amount of fluid per activation, thus ensuring an accurate concentrate to dilutant ratio. After the desired amount of concentrate has been transferred to the second chamber, the dilutant is added to the second chamber through an aperture. The aperture consists of a twist-off or pop-off cap capable of easy removal and attachment. Once the second chamber is filled, the cap is closed and the container is shaken to ensure thorough mixing of the concentrate. This process is repeated, allowing the end user to increase or decrease the strength of the mixture.

Once the concentrate is finished, the consumer need only refill the concentrate chamber through a second aperture and continue using the container as described above.

These and other objects of the invention, as well as many of the intended advantages thereof, will become more readily apparent when reference is made to the following description, taken in conjunction with the accompanying drawings.

BRIEF DESCRIPTION OF THE DRAWINGS

The descriptions which follow are to be understood as illustrative and exemplary of specific structures, aspects and features within the broad scope of the present invention and not as limiting of such broad scope. Like numbers refer to similar features of like elements throughout.

DETAILED DESCRIPTION OF THE PREFERRED EMBODIMENTS

Figure 1:
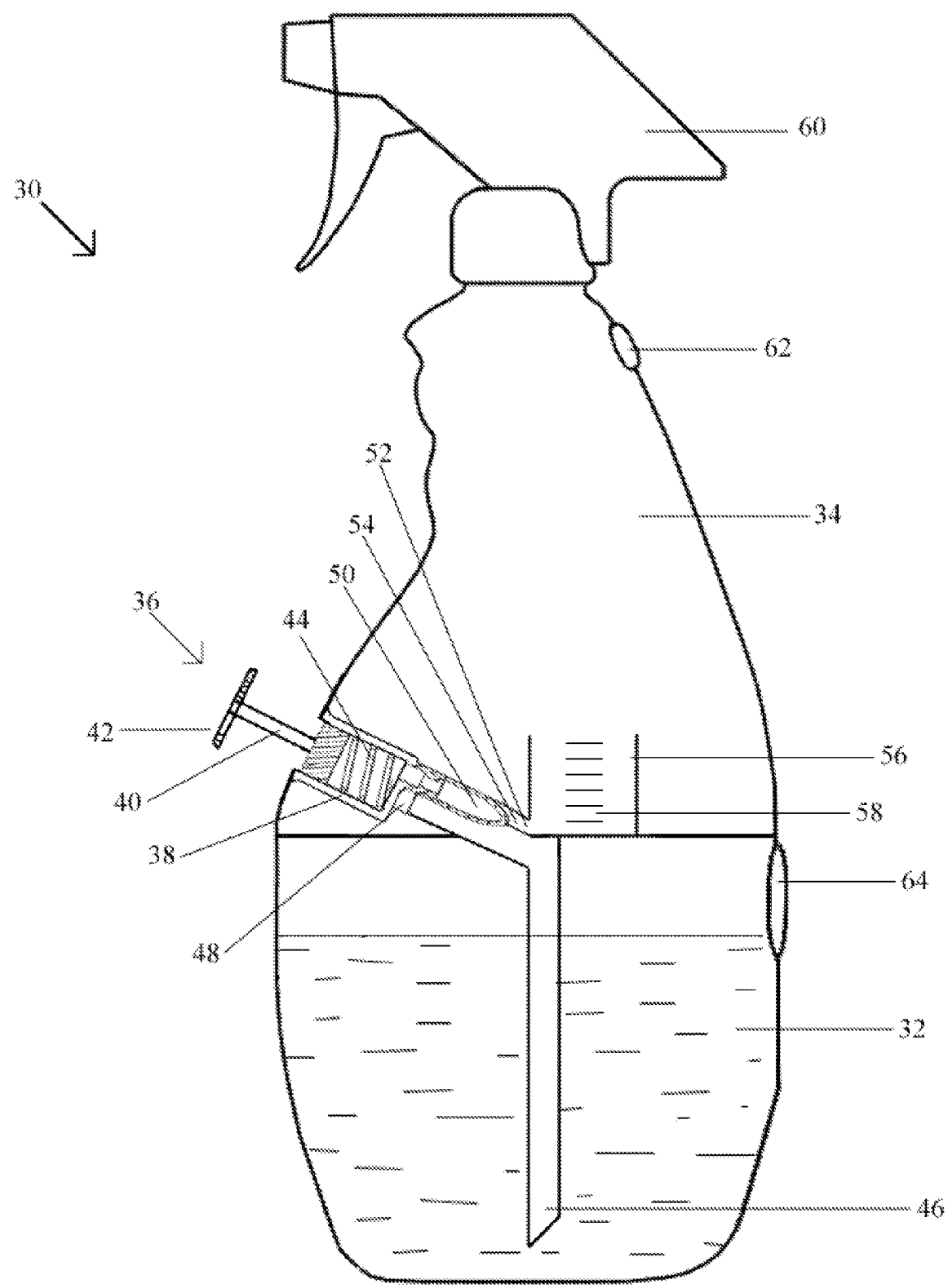
FIG. 1 is a side sectional view of the mixer container with the pump in the retracted position.

The invention will now be described with reference to FIG. 1, which illustrates a side sectional view of the mixer container 30 with the pump actuator 42 in the retracted position. The mixer container 30 contains the lower chamber 32 containing a liquid, an upper chamber 34 that is provided with a pump mechanism referred generally by the number 36, and which functions to pump fluid or liquid in the lower chamber 32 to the upper container 34, and an dispensing mechanism 60. The pump mechanism 36 is provided with a feed pipe 46 reaching the bottom of the lower chamber 32, a pump cylinder 38, and pump actuator 42.

With further reference with FIG. 1, the upper chamber 34 contains a pump mechanism 36 devised of a pump cylinder 38 containing the piston 40 connected to the pump actuator 42. The pump mechanism 36 contains a one way inlet valve 48 connected to the feed pipe 46, an exit pipe 50 leading to an opening 52 containing a one way valve ball 54. The exit pipe 50 leads to the measurement container 56 encompassing graduations 58 thereon.

With continued reference to FIG. 1, the mixer container 30 has an upper chamber aperture 62 and a lower chamber aperture 64. The functions of the apertures 62 and 64 are to allow easy refilling of the independent upper and lower chambers.

In the operation of the invention, the pump mechanism is activated by manually pushing down the pump actuator 42 forcing the piston 40 down thus activating the flow of fluid or liquid from the lower chamber 32 through the feed pipe 46 passed the one way valve 48, through the exit pipe 50 and one way valve ball 54, through the opening 52 and into the measurement container 56. The pump actuator 42 act against a coil spring 44 located in the pump cylinder 38, which returns the pump actuator to its retracted position for additional pumping. Upon completion of pumping, the pump actuator is locked in the activated position.

Figure 2:
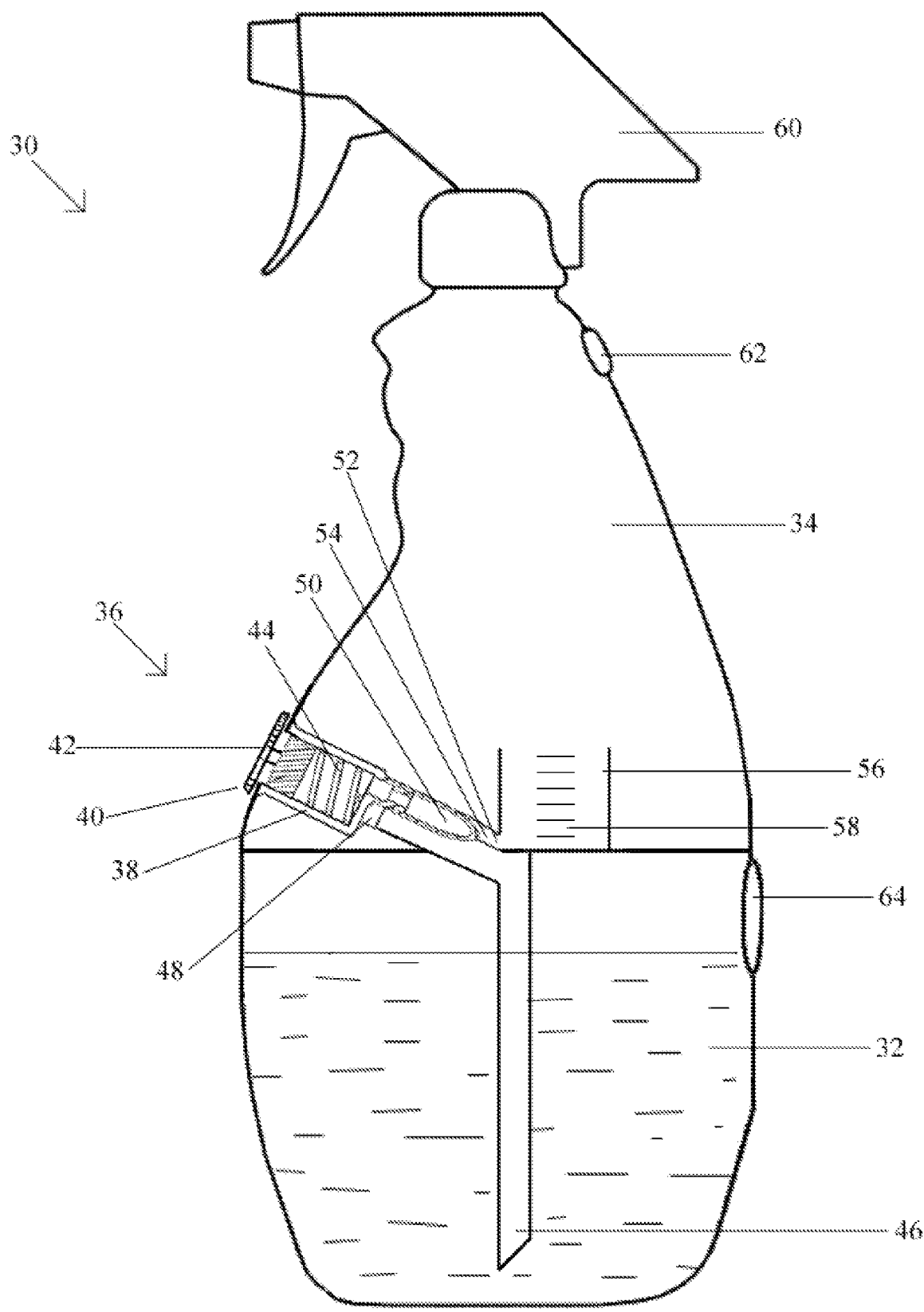
FIG. 2 is a side sectional view of the mixer container with the pump in the activated position.

FIG. 2 is a side sectional view of the mixer container 30 with the pump actuator 42 in the activated position. The mixer container 30 contains the lower chamber 32 containing a liquid, an upper chamber 34 that is provided with a pump mechanism referred generally by the number 36, and which functions to pump fluid or liquid in the lower chamber 32 to the upper container 34, and an dispensing mechanism 60. The pump mechanism 36 is provided with a feed pipe 46 reaching the bottom of the lower chamber 32, a pump cylinder 38, and pump actuator 42.

With further reference with FIG. 2, the upper chamber 34 contains a pump mechanism 36 devised of a pump cylinder 38 containing the piston 40 connected to the pump actuator 42. The pump mechanism 36 contains a one way inlet valve 48 connected to the feed pipe 46, an exit pipe 50 leading to an opening 52 containing a one way valve ball 54. The exit pipe 50 leads to the measurement container 56 encompassing graduations 58 thereon.

With continued reference to FIG. 2, the mixer container 30 has an upper chamber aperture 62 and a lower chamber aperture 64. The functions of the apertures 62 and 64 are to allow easy refilling of the independent upper and lower chambers.

In the operation of the invention, the pump mechanism is activated by manually pushing down the pump actuator 42 forcing the piston 40 down thus activating the flow of fluid or liquid from the lower chamber 32 through the feed pipe 46 passed the one way valve 48, through the exit pipe 50 and one way valve ball 54, through the opening 52 and into the measurement container 56. The pump actuator 42 act against a coil spring 44 located in the pump cylinder 38, which returns the pump actuator to its retracted position for additional pumping. Upon completion of pumping, the pump actuator is locked in the activated position.

Figure 3:
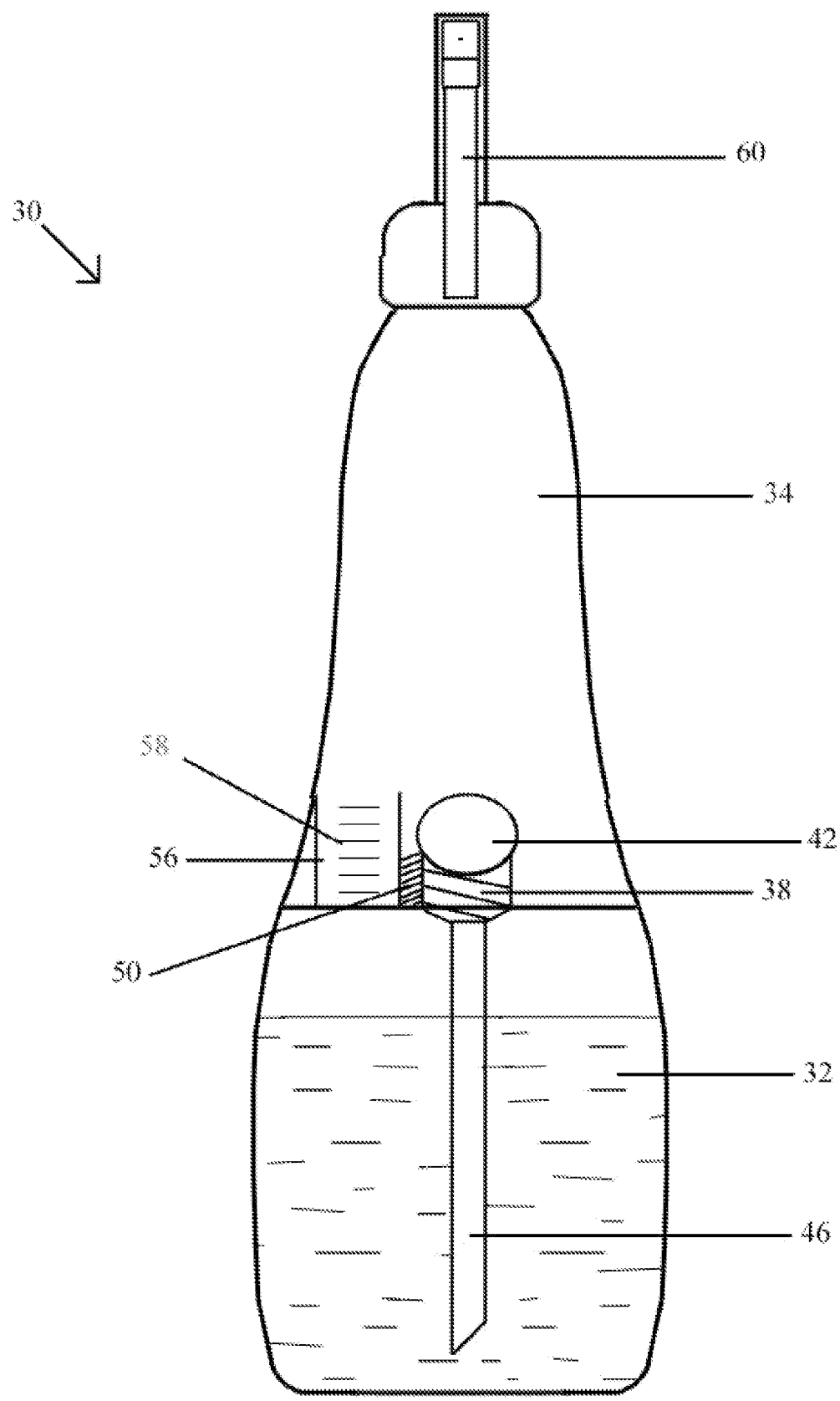
FIG. 3 is a front elevational view of the mixer container.

FIG. 3 is a front elevational view of the mixer container 30 depicting the lower chamber 32, upper chamber 34, pump actuator 42, feed pipe 46, measurement container 56 and dispensing mechanism 60.

Figure 4:
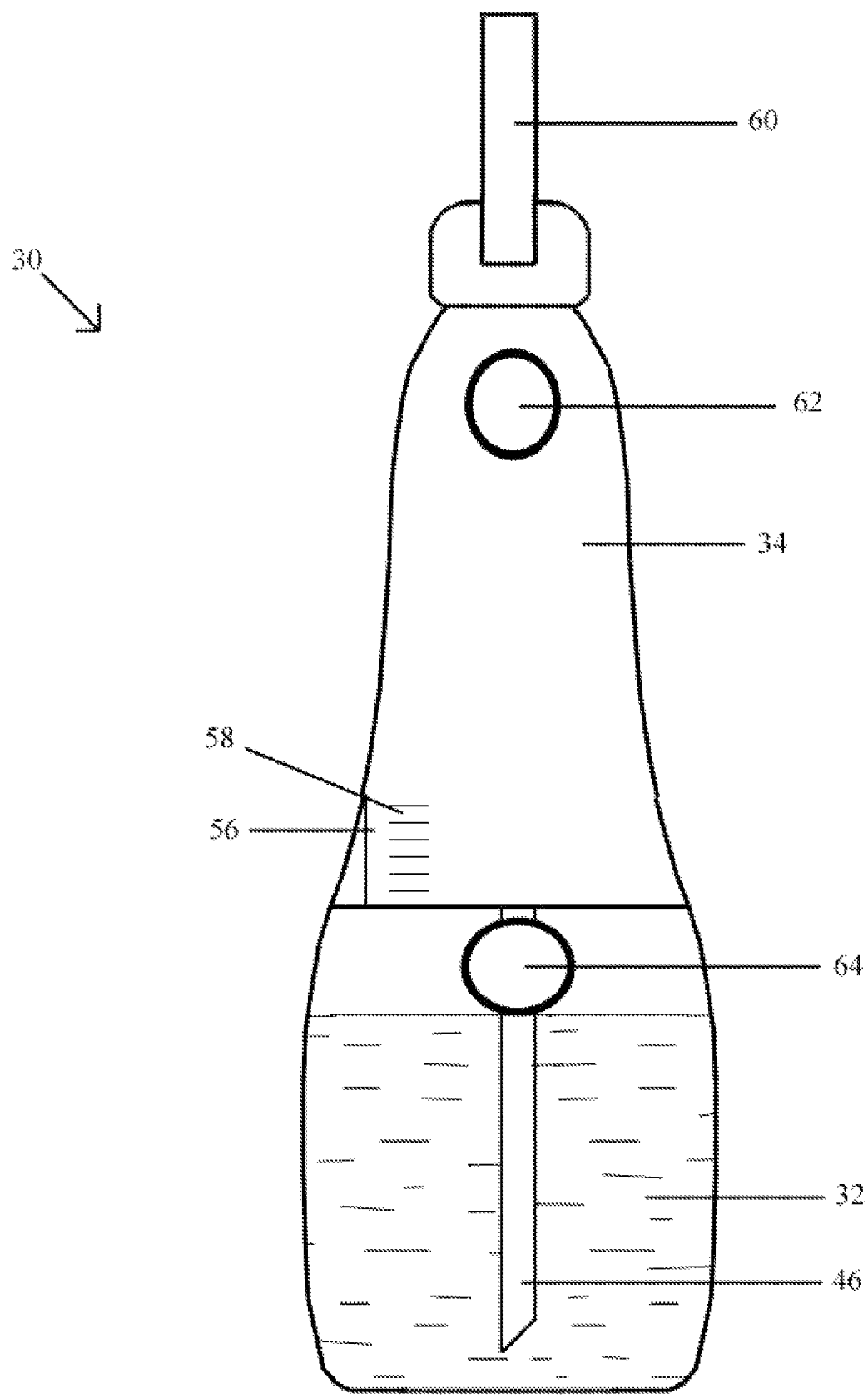
FIG. 4 is a rear elevational view of the mixer container.

FIG. 4 is a rear elevational view of the mixer container 30 depicting the lower chamber 32, upper chamber 34, upper chamber aperture 62, lower chamber aperture 64, feed pipe 46, measurement container 56 and dispensing mechanism 60.

While the foregoing detailed description has described several embodiments of a mixer container 30 in accordance with the present invention, it is to be understood that the above description is illustrative only and not limiting of the disclosed invention. Indeed, it will be appreciated that the embodiments discussed above and the virtually infinite embodiments that are not mentioned could easily be within the scope and spirit of the present invention. Thus, the present invention is to be limited only by the claims as set forth below.

What is claimed is:

1. A mixing and dispensing apparatus comprising:
   a container having two independent chambers, a restrictive device connecting said two chambers capable of displacing the context of the said two independent chambers;
   a first chamber having an interior for retaining a first substance, a feed pipe for siphoning said first substance; and
   a second chamber having an interior for retaining a second substance, a pump mechanism attached to said feed pipe, an exit pipe for dispensing said first substance, and a measurement container.

2. The apparatus of claim 1, further comprising a resealable aperture in said first chamber for refilling.

3. The apparatus of claim 1, further comprising a resealable aperture in said second chamber for refilling.

4. The apparatus of claim 1, further comprising a one way valve in said feed pipe for restricted siphoning of said first substance.

5. The apparatus of claim 1, further comprising a one way valve in said exit pipe for restricted siphoning of said first substance.

6. The apparatus of claim 1, further comprising a measurement gradient in said measurement container.

7. A mixing and dispensing apparatus comprising:
   a container having two independent chambers, a fluid displacement device connecting said two chambers, capable of displacing the context of said two independent chambers;
   a first chamber having an interior for retaining a first substance, a feed pipe for siphoning said first substance, a resealable aperture; and
   a second chamber having an interior for retaining a second substance, a pump mechanism attached to said feed pipe, an exit pipe for dispensing said first substance, a measurement container and a resealable aperture.

8. The apparatus of claim 7, further comprising a one way valve in said feed pipe for restricted siphoning of said first substance.

9. The apparatus of claim 7, further comprising a one way valve in said exit pipe for restricted siphoning of said first substance.

10. The apparatus of claim 7, further comprising a measurement gradient in said measurement container.

* * * * *